US009652040B2

(12) United States Patent
Martinez et al.

(10) Patent No.: US 9,652,040 B2
(45) Date of Patent: May 16, 2017

(54) SCULPTED WAVEFORMS WITH NO OR REDUCED UNFORCED RESPONSE

(71) Applicant: Apple Inc., Cupertino, CA (US)

(72) Inventors: Melisa Orta Martinez, Cupertino, CA (US); Wayne C. Westerman, Cupertino, CA (US); Zhiqiang Gu, Mountainview, CA (US); Duncan Kerr, Cupertino, CA (US); Patrick Kessler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/910,108

(22) PCT Filed: Aug. 8, 2013

(86) PCT No.: PCT/US2013/054220
§ 371 (c)(1),
(2) Date: Feb. 4, 2016

(87) PCT Pub. No.: WO2015/020663
PCT Pub. Date: Feb. 15, 2015

(65) Prior Publication Data
US 2016/0195929 A1    Jul. 7, 2016

(51) Int. Cl.
*G06F 3/01* (2006.01)
*G06F 3/0346* (2013.01)
*G06F 3/0354* (2013.01)

(52) U.S. Cl.
CPC ............ *G06F 3/016* (2013.01); *G06F 3/0346* (2013.01); *G06F 3/03547* (2013.01); *G06F 2203/015* (2013.01)

(58) Field of Classification Search
CPC ..... G06F 3/016; G06F 3/0346; G06F 3/03547
(Continued)

(56) References Cited

U.S. PATENT DOCUMENTS 3,001,049 A    9/1961   Didier
3,390,287 A    6/1968   Sonderegger
(Continued)

FOREIGN PATENT DOCUMENTS

AU    2015100710    7/2015
CA    2355434       2/2002
(Continued)

OTHER PUBLICATIONS

U.S. Appl. No. 12/750,054, filed Mar. 30, 2010, Hill.
(Continued)

*Primary Examiner* — Adam J Snyder
(74) *Attorney, Agent, or Firm* — Brownstein Hyatt Farber Schreck, LLP

(57) ABSTRACT

An electronic device may generate a canceling component that reduces or eliminates the unforced response for a base waveform applied to a component haptic output device of the electronic device. The electronic device may create a sculpted waveform that has no or reduced unforced response and may store the created sculpted waveform. The electronic device may apply the sculpted waveform to the component haptic output device. In one embodiment, a space of at least possible parameters may be defined. Canceling component corresponding to points in the space may be iteratively tested. A heat map may be generated based on the unforced response cancellation or elimination of the canceling components corresponding to the points. Based at least on the heat map, a canceling component may be selected. A sculpted waveform may then be generated by combining the base waveform with the canceling component.

20 Claims, 11 Drawing Sheets

(58) Field of Classification Search
USPC .................................................... 715/701
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,127,756 A | 10/2000 | Iwaki |
| 6,135,886 A | 10/2000 | Armstrong |
| 6,218,966 B1 | 4/2001 | Goodwin |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Suuronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,022,927 B2 | 4/2006 | Hsu |
| 7,023,112 B2 | 4/2006 | Miyamoto et al. |
| 7,081,701 B2 | 7/2006 | Yoon et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Haparnas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,639,232 B2 | 12/2009 | Grant et al. |
| 7,641,618 B2 | 1/2010 | Noda et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,742,036 B2 | 6/2010 | Grant et al. |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |
| 8,069,881 B1 | 12/2011 | Cunha |
| 8,077,145 B2 | 12/2011 | Rosenberg et al. |
| 8,081,156 B2 | 12/2011 | Ruettiger |
| 8,082,640 B2 | 12/2011 | Takeda |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,174,372 B2 | 5/2012 | da Costa |
| 8,179,202 B2 | 5/2012 | Cruz-Hernandez et al. |
| 8,188,623 B2 | 5/2012 | Park |
| 8,205,356 B2 | 6/2012 | Ellis |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |

(56) References Cited

U.S. PATENT DOCUMENTS

| | | |
|---|---|---|
| 8,378,798 B2 | 2/2013 | Bells et al. |
| 8,378,965 B2 | 2/2013 | Gregorio et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,542,134 B2 | 9/2013 | Peterson et al. |
| 8,547,341 B2 | 10/2013 | Takashima et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,614,431 B2 | 12/2013 | Huppi et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,787,006 B2 | 7/2014 | Golko et al. |
| 8,798,534 B2 | 8/2014 | Rodriguez et al. |
| 8,836,502 B2 | 9/2014 | Culbert et al. |
| 8,857,248 B2 | 10/2014 | Shih et al. |
| 8,860,562 B2 | 10/2014 | Hill |
| 8,866,600 B2 | 10/2014 | Yang et al. |
| 8,928,621 B2 | 1/2015 | Ciesla et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,092,129 B2 | 7/2015 | Abdo et al. |
| 9,098,991 B2 | 8/2015 | Park et al. |
| 9,131,039 B2 | 9/2015 | Behles |
| 9,134,834 B2 | 9/2015 | Reshef |
| 9,158,379 B2 | 10/2015 | Cruz-Hernandez et al. |
| 9,178,509 B2 | 11/2015 | Bernstein |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,317,116 B2 | 4/2016 | Ullrich et al. |
| 9,317,118 B2 | 4/2016 | Puskarich |
| 9,325,230 B2 | 4/2016 | Yamada et al. |
| 9,357,052 B2 | 5/2016 | Ullrich |
| 9,430,042 B2 | 8/2016 | Levin |
| 9,448,713 B2 | 9/2016 | Cruz-Hernandez et al. |
| 9,454,239 B2 | 9/2016 | Elias et al. |
| 9,467,033 B2 | 10/2016 | Jun et al. |
| 9,468,846 B2 | 10/2016 | Terrell et al. |
| 9,477,342 B2 | 10/2016 | Daverman et al. |
| 9,501,912 B1 | 11/2016 | Havskjold et al. |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0119573 A1* | 6/2006 | Grant ................ G06F 3/016 345/156 |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0178942 A1* | 8/2007 | Sadler ................ H04M 1/03 455/567 |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0198139 A1* | 8/2008 | Lacroix ................ G06F 3/016 345/173 |
| 2008/0204428 A1 | 8/2008 | Pierce et al. |
| 2008/0255794 A1 | 10/2008 | Levine |
| 2008/0294984 A1* | 11/2008 | Ramsay ................ G06F 3/016 715/702 |
| 2009/0115734 A1 | 5/2009 | Fredriksson et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0141606 A1 | 6/2010 | Bae et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1* | 12/2010 | Cruz-Hernandez ...... G06F 3/016 345/173 |
| 2010/0328229 A1 | 12/2010 | Weber et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0163985 A1* | 7/2011 | Bae .................... G06F 3/016 345/173 |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0127088 A1 | 5/2012 | Pance et al. |
| 2012/0139844 A1 | 6/2012 | Ramstein et al. |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0327006 A1 | 12/2012 | Israr et al. |
| 2013/0063285 A1 | 3/2013 | Elias |
| 2013/0063356 A1 | 3/2013 | Martisauskas |
| 2013/0106699 A1 | 5/2013 | Babatunde |
| 2013/0191741 A1 | 7/2013 | Dickinson et al. |
| 2013/0200732 A1 | 8/2013 | Jun et al. |
| 2013/0228023 A1 | 9/2013 | Drasnin et al. |
| 2013/0261811 A1 | 10/2013 | Yagi et al. |

(56) References Cited

U.S. PATENT DOCUMENTS

| | | |
|---|---|---|
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0232534 A1 | 8/2014 | Birnbaum et al. |
| 2014/0247227 A1* | 9/2014 | Jiang .................. G06F 3/016 345/173 |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0090572 A1 | 4/2015 | Lee et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0163165 A1 | 6/2016 | Morrell et al. |
| 2016/0172953 A1 | 6/2016 | Hamel et al. |
| 2016/0196935 A1 | 7/2016 | Bernstein |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |

FOREIGN PATENT DOCUMENTS

| | | | |
|---|---|---|---|
| CN | 101409164 | | 4/2009 |
| CN | 102713805 | | 10/2012 |
| CN | 103416043 | | 11/2013 |
| CN | 104220963 | | 12/2014 |
| DE | 19517630 | | 11/1996 |
| DE | 10330024 | | 1/2005 |
| DE | 102009038103 | | 2/2011 |
| DE | 102011115762 | | 4/2013 |
| EP | 0483955 | | 5/1992 |
| EP | 1047258 | | 10/2000 |
| EP | 1686776 | | 8/2006 |
| EP | 2060967 | | 5/2009 |
| EP | 2073099 | | 6/2009 |
| EP | 2194444 | | 6/2010 |
| EP | 2264562 A2 | | 12/2010 |
| EP | 2315186 | | 4/2011 |
| EP | 2374430 | | 10/2011 |
| EP | 2395414 | | 12/2011 |
| EP | 2461228 | | 6/2012 |
| EP | 2631746 | | 8/2013 |
| EP | 2434555 | | 10/2013 |
| JP | H05301342 A2 | | 11/1993 |
| JP | 2002199689 | | 7/2002 |
| JP | 2002102799 | | 9/2002 |
| JP | 200362525 | | 3/2003 |
| JP | 2004236202 | | 8/2004 |
| KR | 20050033909 | | 4/2005 |
| KR | 1020100046602 | | 5/2010 |
| KR | 1020110101516 | | 9/2011 |
| KR | 20130024420 A * | 3/2013 | ............ G06F 3/01 |
| TW | 200518000 | | 11/2007 |
| TW | 201218039 | | 5/2012 |
| WO | WO 97/16932 | | 5/1997 |
| WO | WO 01/59588 | | 8/2001 |
| WO | WO 02/073587 | | 9/2002 |
| WO | WO 03/038800 | | 5/2003 |
| WO | WO 2006/057770 | | 6/2006 |
| WO | WO 2007/114631 | | 10/2007 |
| WO | WO 2008/075082 | | 6/2008 |
| WO | WO 2009/038862 | | 3/2009 |
| WO | WO 2009/068986 | | 6/2009 |
| WO | WO 2009/097866 | | 8/2009 |
| WO | WO 2009/122331 | | 10/2009 |
| WO | WO 2009/150287 | | 12/2009 |
| WO | WO 2010/085575 | | 7/2010 |
| WO | WO 2010/087925 | | 8/2010 |
| WO | WO 2011/007263 | | 1/2011 |
| WO | WO 2012/052635 | | 4/2012 |
| WO | WO 2012/129247 | | 9/2012 |
| WO | WO 2013/069148 | | 5/2013 |
| WO | WO 2014/018086 | | 1/2014 |
| WO | WO 2013/169299 | | 11/2014 |
| WO | WO 2015/023670 | | 2/2015 |

OTHER PUBLICATIONS

U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/059,693, filed Oct. 22, 2013, Puskarich.
U.S. Appl. No. 14/165,475, filed Jan. 27, 2014, Havskjold et al.
U.S. Appl. No. 14/493,190, filed Sep. 22, 2014, Hoen.
U.S. Appl. No. 14/512,927, filed Oct. 13, 2014, Hill.
U.S. Appl. No. 14/728,505, filed Jun. 2, 2015, Degner et al.
U.S. Appl. No. 14/841,582, filed Aug. 31, 2015, Morrell et al.
U.S. Appl. No. 14/928,465, filed Oct. 30, 2015, Bernstein.
U.S. Appl. No. 14/942,521, filed Nov. 16, 2015, Hill.
U.S. Appl. No. 15/045,761, filed Feb. 17, 2016, Morrell et al.
U.S. Appl. No. 15/046,194, filed Feb. 17, 2016, Degner et al.
U.S. Appl. No. 15/047,447, filed Feb. 18, 2016, Augenbergs et al.
U.S. Appl. No. 15/068,038, filed Mar. 11, 2016, Bernstein.
U.S. Appl. No. 15/025,243, filed Mar. 25, 2016, Keeler.
U.S. Appl. No. 15/025,425, filed Mar. 28, 2016, Moussette et al.
U.S. Appl. No. 15/025,277, filed Mar. 27, 2016, Morrell et al.
U.S. Appl. No. 15/025,250, filed Mar. 25, 2016, Moussette et al.
U.S. Appl. No. 15/025,254, filed Mar. 25, 2016, Lubinski et al.
U.S. Appl. No. 15/091,501, filed Apr. 5, 2016, Puskarich.
U.S. Appl. No. 15/098,669, filed Apr. 14, 2016, Uttermann et al.
International Search Report and Written Opinion dated Apr. 11, 2014, PCT/US2013/054220, 13 pages.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechatronics, and Haptic Interfaces, ASME, DSC-vol. 49, pp. 73-80, 1993.
Hill et al., "Real-time Estimation of Human Impedance for Haptic Interfaces," Stanford Telerobotics Laboratory, Department of Mechanical Engineering, Standford University, 6 pages, at least as early as Sep. 30, 2009.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
U.S. Appl. No. 15/102,826, filed Jun. 8, 2016, Smith et al.
U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.

* cited by examiner

SCULPTED WAVEFORMS WITH NO OR REDUCED UNFORCED RESPONSE

This application is a 35 U.S.C. §371 application of PCT/US2013/054220, filed on Aug. 8, 2013, and entitled "Sculpted Waveforms with No or Reduced Unforced Response," which is incorporated by reference as if fully disclosed herein.

TECHNICAL FIELD

This disclosure relates generally to haptic device output, and more specifically to sculpted waveform that have no or reduced unforced response.

BACKGROUND

When a base waveform is applied to some devices in order to produce an output (the "forced," or intended, response), such as a base waveform applied to a motor to produce a vibration, an "unforced" (or unintended) response may also be produced. In some cases, a canceling component may be applied to the device in order to reduce or eliminate the unforced response. However, reduction/elimination of the unforced response resulting from the application of a base waveform to a device may require a specific unforced response reduction/elimination canceling component. In order to utilize such an unforced response reduction/elimination canceling component to reduce/eliminate the unforced response, the particular unforced response reduction/elimination canceling component for the particular base waveform must be determined.

For example, a track pad device may be configured to provide a haptic response when touched by a user. To provide the haptic response, a base waveform may be applied to a motor or other actuator that vibrates to cause the track pad to move laterally on a gel bed or other moveable mounting mechanism. This lateral motion may be tactilely perceived by the user similar to a "click" of a button and may be indistinguishable to the user from a vertical motion.

However, the movement of the track pad may not strictly correspond to the base waveform applied to the motor or other actuator. Instead, after the base waveform is applied, the track pad may continue to move with decreasing amounts of kinetic energy for an amount of time after the initial movement associated with the base waveform until the track pad comes to a rest. This unforced response, or "ring down," may be caused by the dissipation of the kinetic energy of the initial movement (similar to how a pendulum swings in increasingly smaller arcs after an initial force puts the pendulum in motion until coming to a stop) in conjunction with a restoring force or element that acts to return the track pad to its initial state, As a result of this unforced response, the haptic response provided by the track pad may feel imprecise or unpleasant to a user and, further, may differ from the intended haptic response. Additionally, the audible response that may result from the unforced response is even more likely to be unpleasant to a user.

SUMMARY

The present disclosure discloses systems and methods for creation and/or utilization of sculpted waveforms with no or reduced unforced response. An electronic device may generate a canceling component that reduces or eliminates the unforced response for a base waveform applied to a component haptic output device of the electronic device. The electronic device may create a sculpted waveform that has no or reduced unforced response and may store the created sculpted waveform. The electronic device may apply the sculpted waveform to the component haptic output device.

In some implementations, as part of generating a canceling component that reduces or eliminates the unforced response for a base waveform, a starting point in a space of at least possible parameters (such as possible times and possible amplitudes/amplitude ratios) for the canceling component may be determined. Additional points in the space may be iteratively selected based on testing of canceling components corresponding to previous selected points until no additional unforced response reduction improvement is detected. The testing of the canceling components may involve applying the base waveform to the component haptic output device, applying one or more of the canceling components to the component haptic output device, and monitoring any unforced response utilizing at least one sensor. The canceling component corresponding to point in the space previous to where no additional improvement is found may be selected as the canceling component. The sculpted waveform may then be created by combining the canceling component and the base waveform into a complex whole, which may then be stored or applied, and may result in minimal ringout.

In various implementations, as part of generating the waveform, an initial point in a space of possible times and possible amplitudes/amplitude ratios for the canceling component may be determined. In some cases, the possible times may include the time between a base waveform and the canceling component, the time between a peak of a base waveform and a peak of the canceling component, the duration of the canceling component, and/or other such times related to canceling components. Similarly, in various cases, the amplitudes may correspond to the amplitudes of the canceling component, the ratio between the amplitude of a base waveform and an amplitude of the canceling component, and/or other such amplitudes related to canceling component. A gradient descent search may then be performed in the space of possible times and possible ratios may be performed to select a canceling component. A sculpted waveform may then be generated by combining the base waveform with the canceling component. The sculpted waveform may be stored and applied to the component haptic output device.

In other implementations, a space of at least possible parameters (such as possible times and possible amplitudes/amplitude ratios) for the canceling component may be defined. Canceling components corresponding to points in the space may be iteratively tested. A heat map may be generated based on the unforced response cancellation or elimination of the canceling components corresponding to the points. Based at least on the heat map, a canceling component may be selected. A sculpted waveform may then be generated by combining the base waveform with the canceling component. The sculpted waveform may be stored and applied to the component haptic output device.

In some cases, a single canceling component corresponding to a point in the space of at least possible parameters (such as possible times and possible amplitudes/amplitude ratios) may be determined to have the best unforced response elimination or reduction and a canceling component corresponding to that single point may be selected as the canceling component. However, in other cases, multiple points in the space of at least possible times and possible amplitudes/amplitude ratios may be determined that have equal unforced response elimination or reduction. In such cases the multiple points may be selected between by comparing the relationship of the points to various factors, such as utilizing a multiple axes graph that correlates the performance of points to multiple factors.

In various implementations, the space of possible parameters (such as possible times and possible amplitudes/amplitude ratios) may be two-dimensional. However, in other implementations the space may include dimensions beyond two and/or may represent other damped response cancelling waveform parameters other than possible times and amplitudes/amplitude ratios. For example, in various implementations, the space may be a space of possible canceling component widths and canceling component skews.

In some implementations, an electronic device may create the sculpted waveform and applying such to a haptic output component instead of the base waveform. In other implementations, different electronic devices (which may be different instances of the same and/or similar device) may create the sculpted waveform and apply such to a haptic output component instead of the base waveform. For example, a laptop computer at a factory may be utilized to create the sculpted waveform at a factory. Such a sculpted waveform may be recorded on various laptop computers of the same or similar type that are produced by the same and/or related factories and may be applied to haptic output components even though the various laptop computers did not themselves create the sculpted waveform.

In one or more implementations, the haptic output component may be a haptic track pad (or similar device) that is positioned on a gel bed (or similar movement mechanism) and is configured to provide haptic feedback by applying a waveform to an actuator to cause the haptic track pad to move laterally (or otherwise). In such implementations, the sensor utilized to analyze unforced response elimination or reduction of canceling components may be a motion sensor, accelerometer, gyroscope, or similar sensor that detects movement of the haptic track pad.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
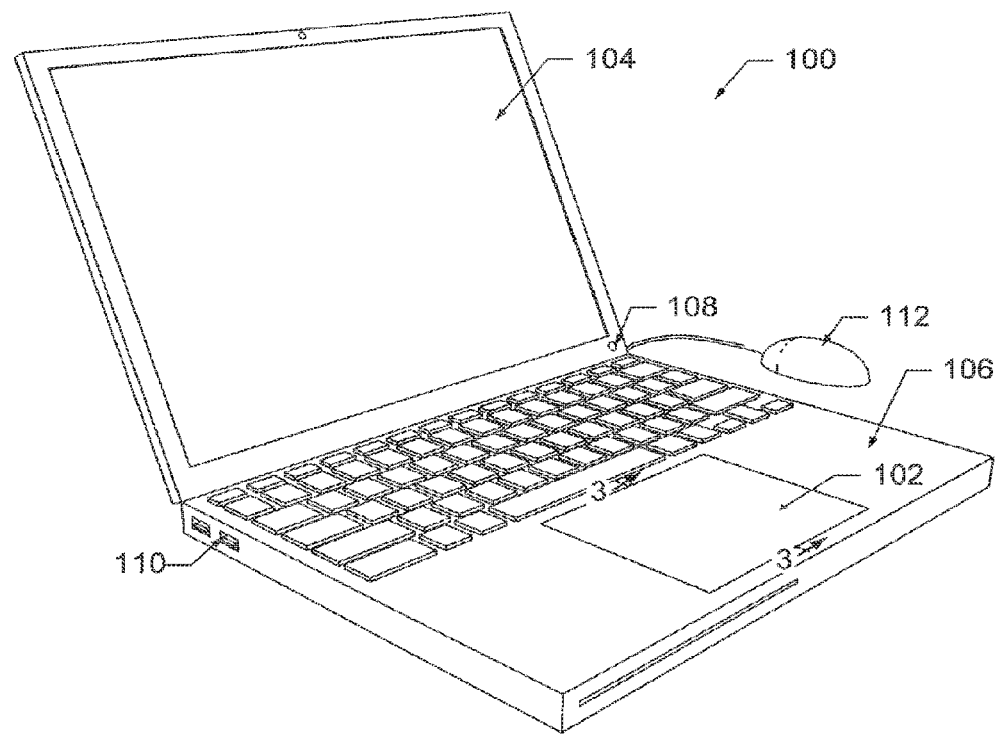
FIG. 1A is a perspective view of an example electronic device that may create and/or utilize sculpted waveforms with no or reduced unforced response.

The description that follows includes sample systems, methods, and apparatuses that embody various elements of the present disclosure. However, it should be understood that the described disclosure may be practiced in a variety of forms in addition to those described herein.

The present disclosure discloses systems and methods for creation and/or utilization of sculpted waveforms with no or reduced unforced response. An electronic device may generate a canceling component that reduces or eliminates the unforced response for a base waveform applied to a component haptic output device of the electronic device. The electronic device may create a sculpted waveform that has no or reduced unforced response and may store the created sculpted waveform. The electronic device may apply the sculpted waveform to the component haptic output device.

As part of generating a canceling component that reduces or eliminates the unforced response for a base waveform, a starting point in a space of at least possible parameters (such as possible times and possible amplitudes/amplitude ratios) for the canceling component may be determined. Additional points in the space may be iteratively selected based on testing of canceling component corresponding to previous selected points until no additional unforced response reduction improvement is detected. The testing of the canceling component may involve applying the base waveform to the component haptic output device, applying one or more of the canceling component to the component haptic output device, and monitoring any unforced response utilizing at least one sensor. The canceling component corresponding to point in the space previous to where no additional improvement is found may be selected as the canceling component. The sculpted waveform may then be created by combining the canceling component and the base waveform into a complex whole, which may then be stored or applied, and should result in minimal ringout.

Generating the canceling component may include determining an initial point in a space of possible times and possible amplitudes/amplitude ratios for the canceling component. In some cases, the possible times may include the time between a base waveform and the canceling component, the time between a peak of a base waveform and a peak the waveform, the duration of the canceling component, and/or other such times related to canceling components. Similarly, in various cases, the amplitudes may correspond to the amplitudes of the canceling component, the ratio between the amplitude of a base waveform and an amplitude of the canceling component, and/or other such amplitudes related to canceling components.

In one embodiment, a gradient descent search may be permed in the space of possible times and possible amplitude/amplitude ratios. A first region, such as a box (and/or other shape), may be defined in the space around the initial point and the application of canceling components corresponding to points on the edge of the first region may be compared to an application of a canceling component corresponding to the initial point to determine a point on the edge that corresponds to a canceling component with improved unforced response elimination or reduction. In cases where application of canceling components corresponding to multiple points yield identical improved unforced response elimination or reduction, other factors may be evaluated to compare the application of the canceling component. Application of canceling component corresponding to points along a vector defined by the initial point and the point on the edge that corresponds to the canceling component with improved unforced response elimination or reduction may be tested by applying canceling component corresponding to the points until a vector point (i.e., a point along the vector) is found beyond which no additional unforced response elimination or reduction is found. A second region (and/or other shape) may be defined around the vector point and application of canceling components corresponding to points on the edges of the second region may be compared with the canceling component corresponding to the vector point. This process may be performed iteratively until no application of canceling components corresponding to points on the edge of a region defined around a particular point yield any detectable unforced response elimination or reduction over the particular point, whereupon the canceling component may be selected as a canceling component corresponding to the particular point. A sculpted waveform may then be generated by combining the base waveform with the canceling component. The sculpted waveform may be stored and applied to the component haptic output device.

In certain implementations, some or all of the regions may have the same dimensions and/or may be based on an error of a sensor utilized to evaluate canceling components related to the points.

In another embodiment, a space of at least possible parameters (such as possible times and possible amplitudes/amplitude ratios) for the canceling component may be defined. Canceling components corresponding to points in the space may be iteratively tested. A heat map may be generated based on the unforced response cancellation or elimination of the canceling components corresponding to the points. Based at least on the heat map, a canceling component may be selected. A sculpted waveform may then be generated by combining the base waveform with the canceling component. The sculpted waveform may be stored and applied to the component haptic output device.

Figure 1B:
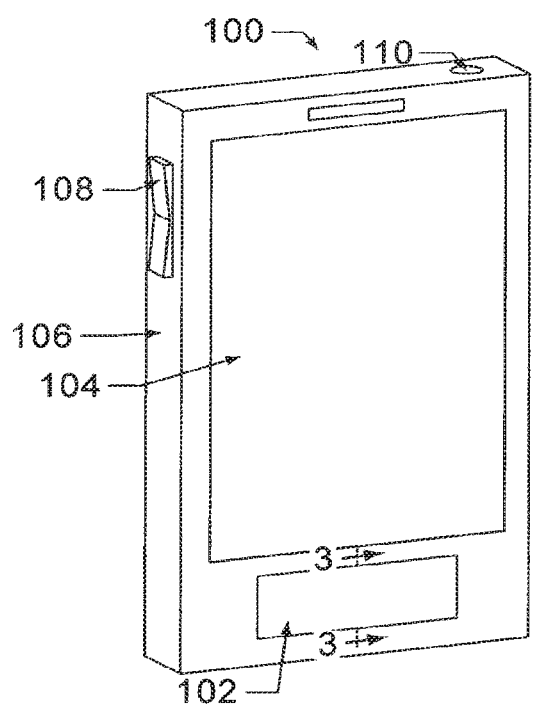
FIG. 1B is a perspective view of another example of an electronic device that may create and/or utilize sculpted waveforms with no or reduced unforced response.

FIG. 1A is an isometric view of an example electronic device 100 that may create and/or utilize sculpted waveforms with no or reduced unforced response, FIG. 1B is an isometric view of another example of the electronic device 100. As shown in FIG. 1A, the electronic device 100 may be a laptop computer and as shown in FIG. 1B, the electronic device 100 may be a smart phone or mobile electronic device. It should be noted that the electronic devices 100 illustrated in FIGS. 1A and 1B are illustrative only and substantially any other type of electronic devices, such as but not limited to, a computer, mobile phone, smart phone, digital music player, digital camera, calculator, personal digital assistant, television, and so on may be used.

With reference to FIGS. 1A and 1B the electronic device 100 may include a haptic device 102, an input member 108, a display 104, an input port 110, a keyboard 114 or other input device, one or more sensors 140, and an enclosure 106 at least partially surrounding select or all of the components of the electronic device 100. Referring to FIG. 1A, the electronic device 100, via the input port 110, may also be in communication with one or more external devices 112. In some embodiments, the haptic device 102 may be incorporated into an external device 112, such as a mouse, track pad, joystick, or other input device.

Figure 2:
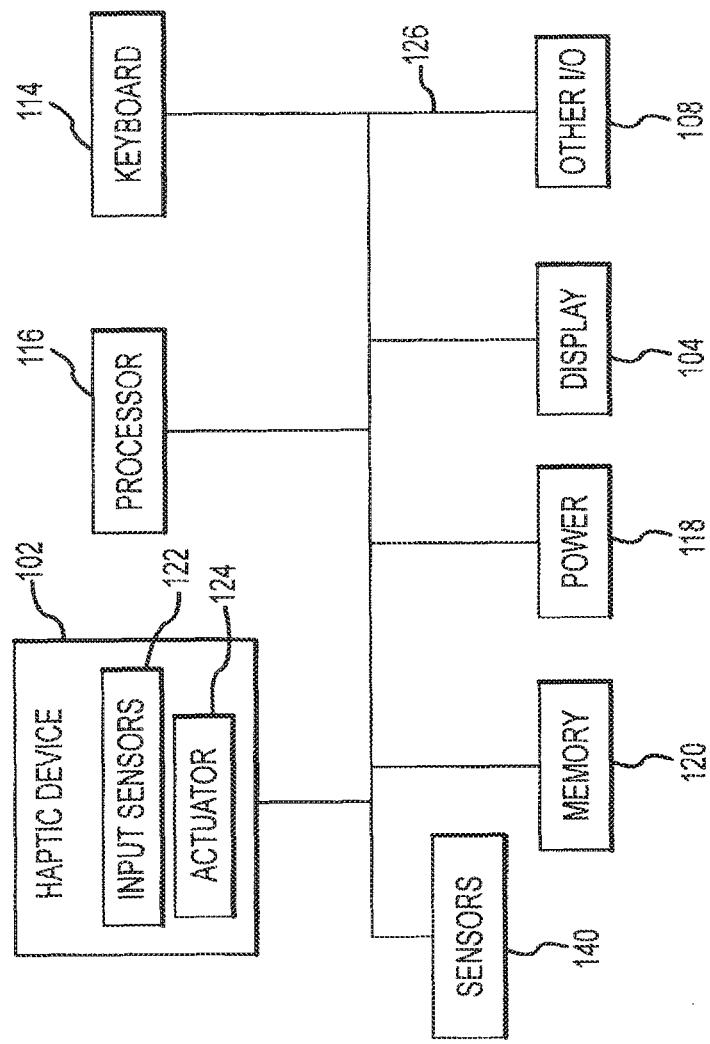
FIG. 2 is a block diagram illustrating an electronic device that may create and/or utilize sculpted waveforms with no or reduced unforced response. The electronic device may be the electronic device of FIG. 1A or 1B.

FIG. 2 is a block diagram illustrating an electronic device 100 that may create and/or utilize sculpted waveforms with no or reduced unforced response. The electronic device may be the electronic device of FIG. 1A or 1B.

The electronic device 100 may include a processor 116, a power source 118, and a memory component 120, all of which may be in communication by one or more system buses 126. The processor 116 may further be in communication with the haptic device 102 in order to control an actuator 124 for the haptic device 102 and/or receive data from one or more input sensors 122 of the haptic device 102, discussed in more detail below.

The memory 120 may store electronic data that may be utilized by the electronic device 100. For example, the memory 120 may store electrical data or content e.g., audio files, video files, document files, and so on, corresponding to various applications. In some embodiments, the memory 120 may store user settings with respect to the haptic device 102. The memory 120 may be, for example, non-volatile storage, a magnetic storage medium, optical storage medium, magneto-optical storage medium, read only memory, random access memory, erasable programmable memory, flash memory, or a combination of one or more types of memory components.

The electronic device 100 may also include one or more sensors 140, in addition to the input sensors 122 of the haptic device 102. The sensors 140 may provide substantially any type of input to the electronic device 100. For example, the sensors 140 may be one or more accelerometers, gyroscopes, light sensors, image sensors (such as a camera), force sensors, and so on, It should be noted that FIGS. 1A-2 are for the purposes of example only. In other examples, the electronic device may include fewer or more components than those shown in FIGS. 1A-2. Additionally, the illustrated electronic devices are only exemplary devices incorporating the haptic device 102. In other embodiments, the haptic device 102 may be incorporated into substantially any type of device that provides haptic feedback to a user.

In various implementations, a base waveform may be applied to the haptic device 102 (such as to the actuator 124 of the haptic device 102). In some cases, the base waveform May be applied in order to provide a haptic response to a user. The application of the base waveform to the haptic device may cause an output (the forced or intended haptic response). The application of the base waveform to the haptic device may also cause an unforced (or unintended) response. This unforced response may result from the haptic device 102 (and/or the actuator 124) settling to rest with decreasing amounts of energy after the application of the base waveform. This unforced response, or "ring down,"

may cause the haptic response provided by the haptic device 102 to feel imprecise or unpleasant to a user and, further, may differ from the intended haptic response to be produced by the base waveform. Additionally, the audible response that may result from such is even more likely to be unpleasant to a user.

For example, as illustrated in FIGS. 1A and 1B, the haptic device 102 may be a haptic track pad. Such a haptic track pad may apply a base waveform to one or more actuators in order to provide haptic feedback. In some cases, the haptic track pad may be suspended on a gel bed or other such moveable mounting mechanism and the application of the base waveform may cause the haptic track pad to move laterally, which may be tactilely perceived by a user as a response to a touch similar to a "click" of a button. Such lateral motion may be indistinguishable to the user from a vertical motion.

However, the lateral motion of the haptic track pad may not strictly correspond to the base waveform. Once set in motion by the base waveform, the haptic track pad may continue to move with decreasing amounts of kinetic energy in response to the movement related to the base waveform until the kinetic energy is fully dissipated and the haptic track pad comes to a complete rest. Such continuing motion may be the unforced response related to the base waveform. The motion of the haptic track pad corresponding to the forced and/or the unforced response may be measured by one or more sensors (such as one or more motion detectors, accelerometers, gyroscopes, and so on) that monitor the motion of the haptic track pad.

To eliminate or reduce the unforced response related to such a base waveform, one or more canceling components may be determined and applied to the haptic track pad. Such canceling components may disrupt the unforced, eliminating or reducing out such, causing the haptic track pad to come to a complete rest faster and/or more efficiently than in the absence of the application of such a canceling component. Such canceling components may be combined with the base waveform (generating a complex waveform) to create a sculpted waveform. The sculpted waveform, which has no or reduced unforced response as compared to the base waveform, may be stored and utilized instead of the base waveform.

Although the immediately preceding discussion concerns a haptic track pad (and although FIGS. 1A and 1B illustrate a track pad and FIG. 2 illustrates a haptic device) it is understood that this is for the purposes of example. In various implementations, the techniques disclosed herein may be utilized with any haptic output component and/or device (such as a haptic mouse, touch screen, and so on) to which a base waveform is applied resulting in a forced and an unforced response without departing from the scope of the present disclosure.

Figure 3:
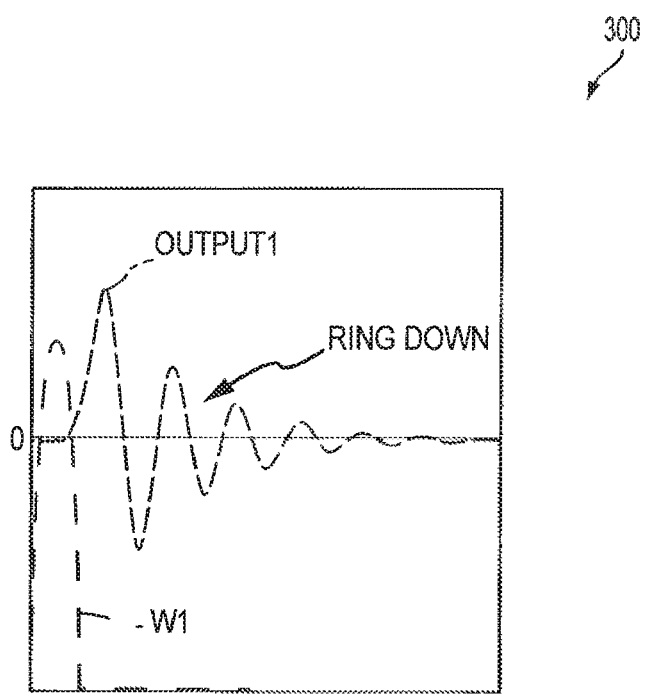
FIG. 3 is a chart illustrating a base waveform, the output of the base waveform, and the unforced response of the base waveform.

FIG. 3 is a chart illustrating a base waveform W1, the forced response of the base waveform OUTPUT 1, and the unforced response of the base waveform RING DOWN. The vertical axis corresponds to amplitude and the horizontal axis to time. The forced response of the base waveform OUTPUT1 may not strictly correspond to the base waveform W1. Instead, after the base waveform W1 is applied, the haptic output device to which the base waveform W1 was applied may continue to output with decreasing amounts of kinetic energy for an amount of time after the initial movement associated with the base waveform W1 until the component of the haptic output device to which the base waveform W1 was applied comes to a rest. This unforced response, or "ring down," may be caused by the dissipation of the kinetic energy of the initial application of the base waveform W1 (similar to how a pendulum swings in increasingly smaller arcs after an initial force puts the pendulum in motion until coming to a stop) in conjunction with a restoring force or element that acts to return the haptic output device to its initial state.

Figure 4A:
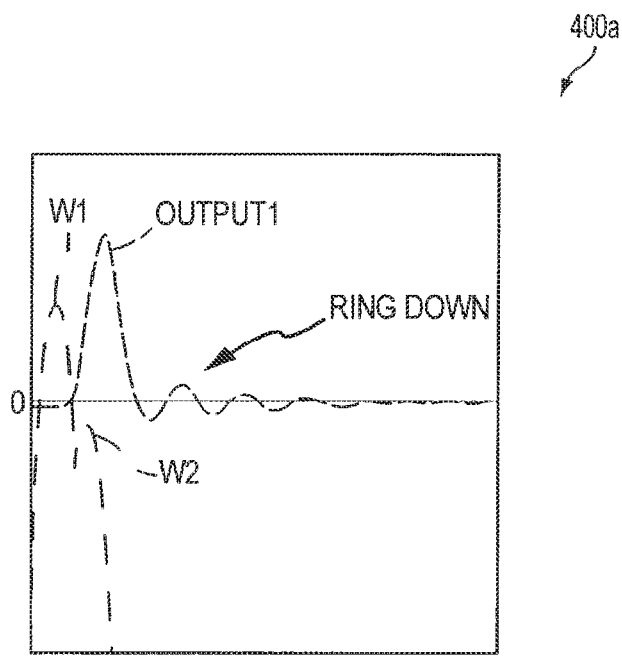
FIG. 4A is a chart illustrating a first example of a canceling component reducing the unforced response of a base waveform.

FIG. 4A is a chart illustrating a first example of a canceling component W2 reducing the unforced response of the base waveform W1, where the chart axes are amplitude along the vertical axis and time along the horizontal axis. As can be seen by comparing FIGS. 3 and 4A, the unforced response RING DOWN of the base waveform W1 may be reduced (such as in amplitude and/or duration) by the application of the canceling component W2. Although canceling component W2 and the base waveform W1 are described as separate waveforms, it is understood that W2 and W1 may be components of a complex, sculpted waveform. Such a sculpted waveform may have a first and second "hump" or maximum value, each hump generally corresponding to a maximum axial value (such as amplitude) of the base waveform and the canceling component.

Figure 4B:
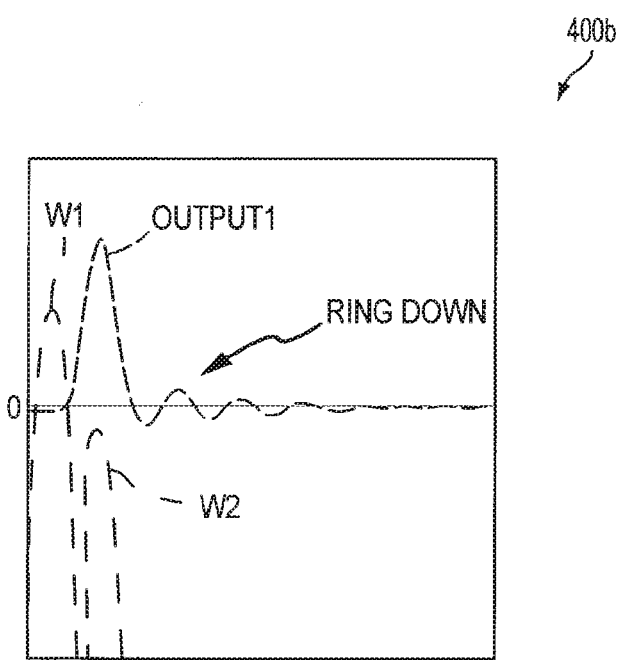
FIG. 4B is a chart illustrating a second example of a canceling component reducing the unforced response of a base waveform.

As illustrated in FIG. 4A, the canceling component W2 may overlap in time with the base waveform W1. However, it is understood that this is for the purposes of example. FIG. 4B illustrates a second example of a canceling component W2 that does not overlap in time with the base waveform W1. Further, though FIGS. 4A and 4B illustrate canceling components W2 that have a same waveform shape (such as a sin wave) as the base waveform W1, is understood that this is for the purposes of example and that in various implementations the canceling component W2 may have a different waveform shape than the base waveform W1. Additionally, though FIGS. 4A and 4B illustrate canceling components W2 that have smaller amplitudes than the base waveform W1, is understood that this is for the purposes of example and that in various implementations the canceling component W2 may have the same or higher amplitude than the base waveform W1.

Figure 5:
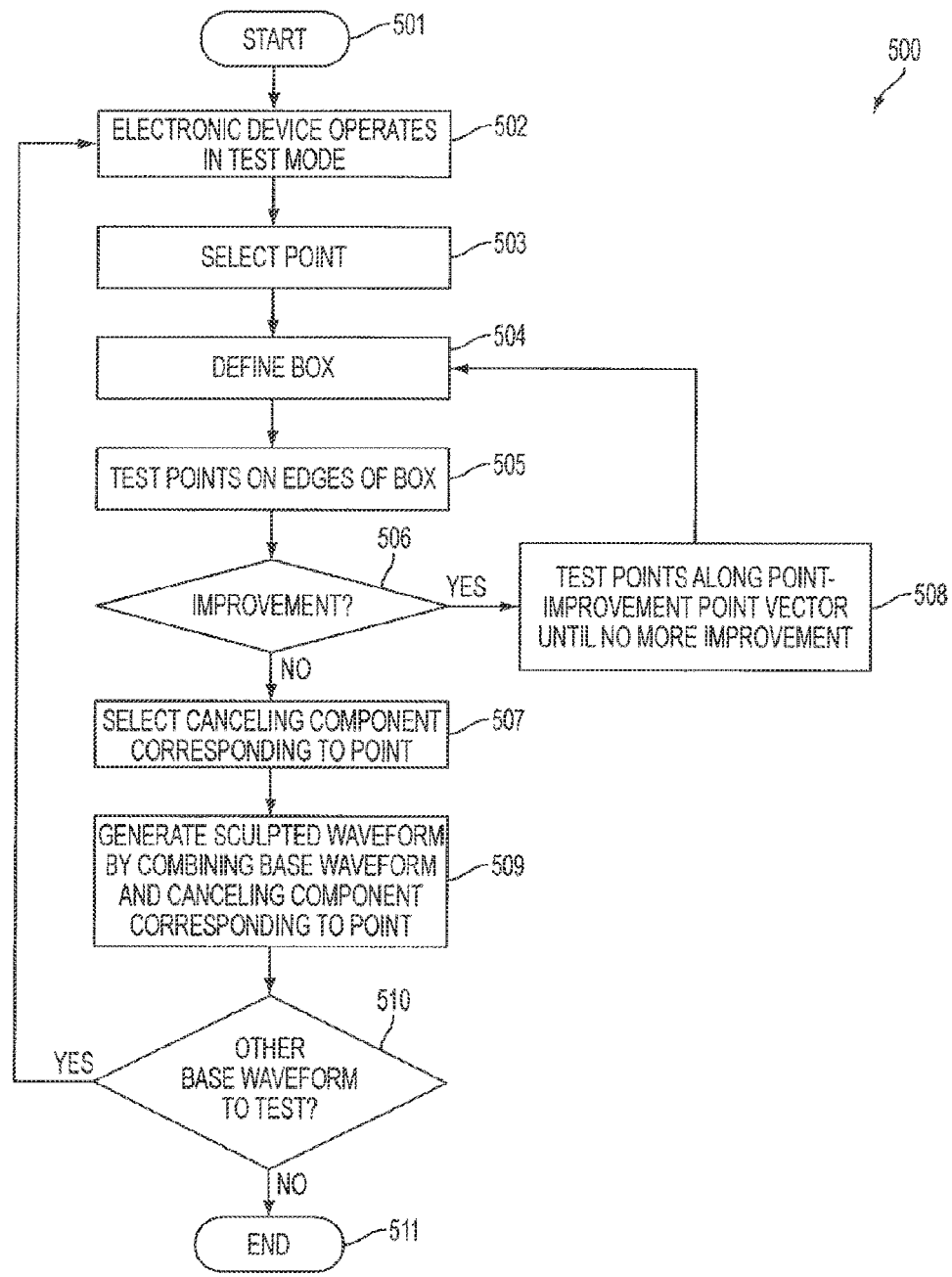
FIG. 5 is a flow chart illustrating a first example method for creating a sculpted waveform with no or reduced unforced response. This method may be performed by the electronic devices of FIG. 1A, 1B, or 2.

FIG. 5 illustrates a first example method 500 for creating a sculpted waveform with no or reduced unforced response. The method 500 may be performed by the electronic devices of FIG. 1A, 1B, 2, or any suitable electronic device. The flow begins at block 501 and proceeds to block 502 where the electronic device operates in a test mode. The flow then proceeds to block 503 where the electronic device selects a point in a defined space of possible parameters (such as possible times and amplitudes/amplitude ratios) for a canceling component that eliminates or reduces the unforced response of a base waveform. Such selection may involve testing the unforced response elimination or reduction of a canceling component corresponding to the point by applying the base waveform to the component haptic output device, applying the canceling component corresponding to the point, and monitoring the component haptic output device to determine the unforced response utilizing at least one sensor.

Figure 6:
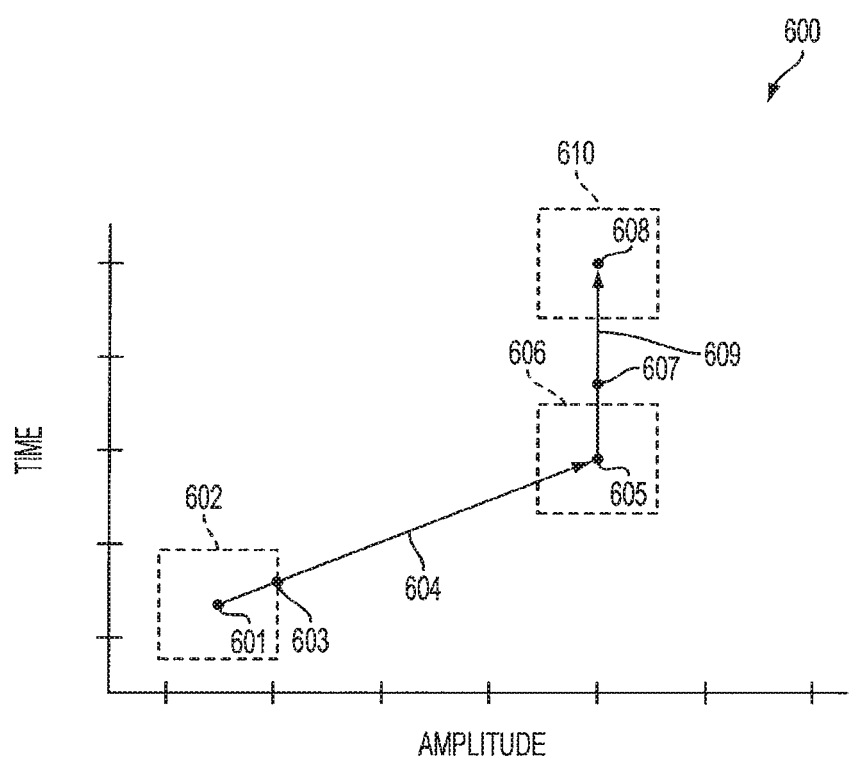
FIG. 6 is a chart illustrating the performance of the method of FIG. 5 to create a sculpted waveform with no or reduced unforced response within a two-dimensional space of possible times and amplitudes/amplitude ratios.

In some cases, such a space may be a two dimensional space of times and amplitudes/amplitude ratios. Such a two-dimensional space of times and amplitudes is illustrated in the chart of FIG. 6. Returning to FIG. 5, in other cases the space may include more than two dimensions and may thus include other possible parameters for canceling components.

In some cases, the times may correspond to the time between the base waveform and the canceling component. In other cases, the times may correspond to the time between a peak of the base waveform and a peak of the canceling component. In still other cases, the times may correspond to the duration of the canceling component. In some cases, the amplitudes may correspond to the amplitudes of the canceling component. In other cases, the amplitudes may correspond to the ratio between the amplitude of the base waveform and the amplitude of the canceling component. In various cases, the point may be arbitrarily chosen or may be chosen based on other such factors such as previous analysis of canceling components corresponding to points in the space as unforced response eliminating or reducing canceling components, a resonant frequency of the electronic device, minimum values for the parameters of the canceling component, user input, and so on.

The method 500 may perform a gradient descent search in the space of possible parameters, which is broadly described below. The flow then proceeds to block 504 where the electronic device defines a region (which may be a box or other shape) around the point. Such a region may have dimensions based on an error of the sensor. For example, in some cases the sensor may have an error that causes the sensor to be unable to distinguish between the unforced response elimination or reduction of two canceling components if the unforced response eliminations or reductions are only slightly different. In such a case, the region may have dimensions such that the edges of the region correspond to points in the space that are far enough away from the point that the differences between the unforced response elimination or reduction of a canceling component corresponding to a point on the edge of the region and the unforced response elimination or reduction of the canceling component corresponding to the point are distinguishable by the sensor despite the error of the sensor.

Next, the flow proceeds to block 505 where the electronic device tests points on the edges of the region. Such testing may involve comparing points on the edges of the region with the point. Such comparison may involve comparing the unforced response elimination or reduction of the base waveform by a canceling component corresponding to the point monitored using the sensor with the unforced response eliminations or reductions of canceling components corresponding to the points on the edges of the region. In some cases, comparison of the unforced response eliminations or reductions may include comparison of relationships between the point or the points on the edges of the region and various related factors (see FIG. 10).

The flow then proceeds to block 506 where the electronic device determines whether or not any of the points on the edge of the region are an improvement over the point (such as based on the comparisons discussed above). In cases where application of canceling components corresponding to multiple points yields identical unforced response elimination or reduction, such relationships and related factors may be utilized to distinguish among the canceling components. If so, the flow proceeds to block 509. Otherwise, the flow proceeds to block 507.

At block 507, after the electronic device determines that none of the points on the edge of the region are an improvement over the point, the electronic device selects the canceling component corresponding to the point. The flow then proceeds to block 509 where the electronic device generates a sculpted waveform by combining the base waveform with the canceling component corresponding to the point. Subsequently, the sculpted waveform may be utilized instead of the base waveform.

The flow then proceeds to block 510 where the electronic device determines whether or not to test other base waveforms. If so, the flow returns to block 502 and continues to operate. Otherwise, the flow proceeds to block 511 and ends.

At block 508, after the electronic device determines that one of the points on the edge of the region is an improvement over the point, the electronic device iteratively tests canceling components corresponding to points along a vector defined by the point and the improved point on the edge of the region until a subsequent point on the vector does not yield additional detectable unforced response elimination or reduction over a previous point on the vector (or until a preset searching limit is reached on the vector in cases where such a preset limit has been set to constrain the amount of testing that is performed along the vector). The flow then returns to block 504 and 505 where the electronic device defines a new region (such as a box or other shape) around the point of the vector where unforced response elimination or reduction improvement could be detected and compares that point to points on the edges of the new region. The new region may have the same dimensions as the previous region and may be based on an error of the sensor.

Although the method 500 is illustrated and described above as including particular operations performed in a particular order, it is understood that this is for the purposes of example. In other implementations, other configurations of the same, similar, and/or different operations may be performed without departing from the scope of the present disclosure.

For example, blocks 504-506 and 508 define a first region around a point, test points on the edge of the first region in an attempt to find an improved point, test points along a vector defined by the point and the improved point until a vector point is reached where no more improvement is found, and then repeat the process with a second region defined around the vector point is reached. However, it is understood that this is for the purposes of example and that such a series of operations may be performed iteratively. As such, new regions may be defined around a new point when no further improvement around found along a vector defined by a previous region (defined around a previous point) and an improved point on the edge of the previous region any number of times (such as until no point on the edge of the new region yields any improvement over the new point, whereupon a canceling component corresponding to the new point may be selected as the waveform). All of the defined regions may share dimensions and may be based on an error of the sensor.

FIG. 6 is a chart illustrating an example performance of a gradient descent search performed as part of the method 500 within a two-dimensional space of times and amplitudes/amplitude ratios. (It should be appreciated that the space may be defined by any number of suitable parameters or combinations of parameters, including widths and skews of a canceling component, as well as any factor discussed with respect to FIG. 10 or parameters related to these factors.) As illustrated, an initial point 601 may be selected. A region 602 may be defined around the initial point 601. The dimensions of the region 602 may be based on an error of at least one sensor. Points on the edge of the region 602 may be compared to the initial point 601. As illustrated, a point 603 on the edge of region 602 may be determined to be an improvement over the initial point 601.

Such improvement may be determined by comparing the unforced response elimination or reduction of the base waveform by a canceling component corresponding to the initial point 601 monitored using the sensor with the unforced response elimination or reduction of the canceling component corresponding to the point 603 (and/or other points on the edges of the region 602). In some cases, comparison of the unforced response eliminations or reductions may include comparison of relationships between the initial point 601, the pint 603, and/or other points on the edges of the region 602 and various related factors (see FIG. 10).

A vector 604 may be defined by the initial point 601 and the improved point 603. Points along the vector 604 may be tested until a point 605 on the vector 604 is reached beyond which no additional improvement is found (or until a preset searching limit is reached).

A second region 606 may be defined around the point 605. The dimensions of the region 606 may be based on an error of the sensor and may share dimensions with the region 602. Points on the edge of the region 606 may be compared to the point 605. As illustrated, a point 607 on the edge of region 606 may be determined to be an improvement over the point 605.

A second vector 609 may be defined by the point 605 and the improved point 607. Points along the vector 609 may be tested until a point 608 on the vector 609 is reached beyond which no additional improvement is found (or until a preset searching limit is reached).

A third region 610 may be defined around the point 608. The dimensions of the region 610 may be based on an error of the sensor and may share dimensions with the regions 606 and 602. Points on the edge of the region 610 may be compared to the point 25 608.

However, in this example, no point on the edge of region 610 yields any additional improvement over point 608. As such, a canceling component corresponding to point 608 may be selected. Subsequently, a sculpted waveform may be generated by combining the selected canceling component with the base waveform. The sculpted waveform may be stored and may be applied instead of the base waveform.

Although FIG. 6 illustrates a particular example of the performance of a gradient descent search performed as part of the method 500. It is understood that this is an example and is not intended to be limiting. In various implementations, the same, similar, and/or different operations may be performed in a variety of different orders without departing from the scope of the present disclosure. For example, though FIG. 6 illustrates defining a series of three regions around three points and testing points along two vectors, such a process may involve testing any number for points along any number of vectors and/or defining any number of regions in various instances of performing the method 500 without departing from the scope of the present disclosure.

Figure 7:
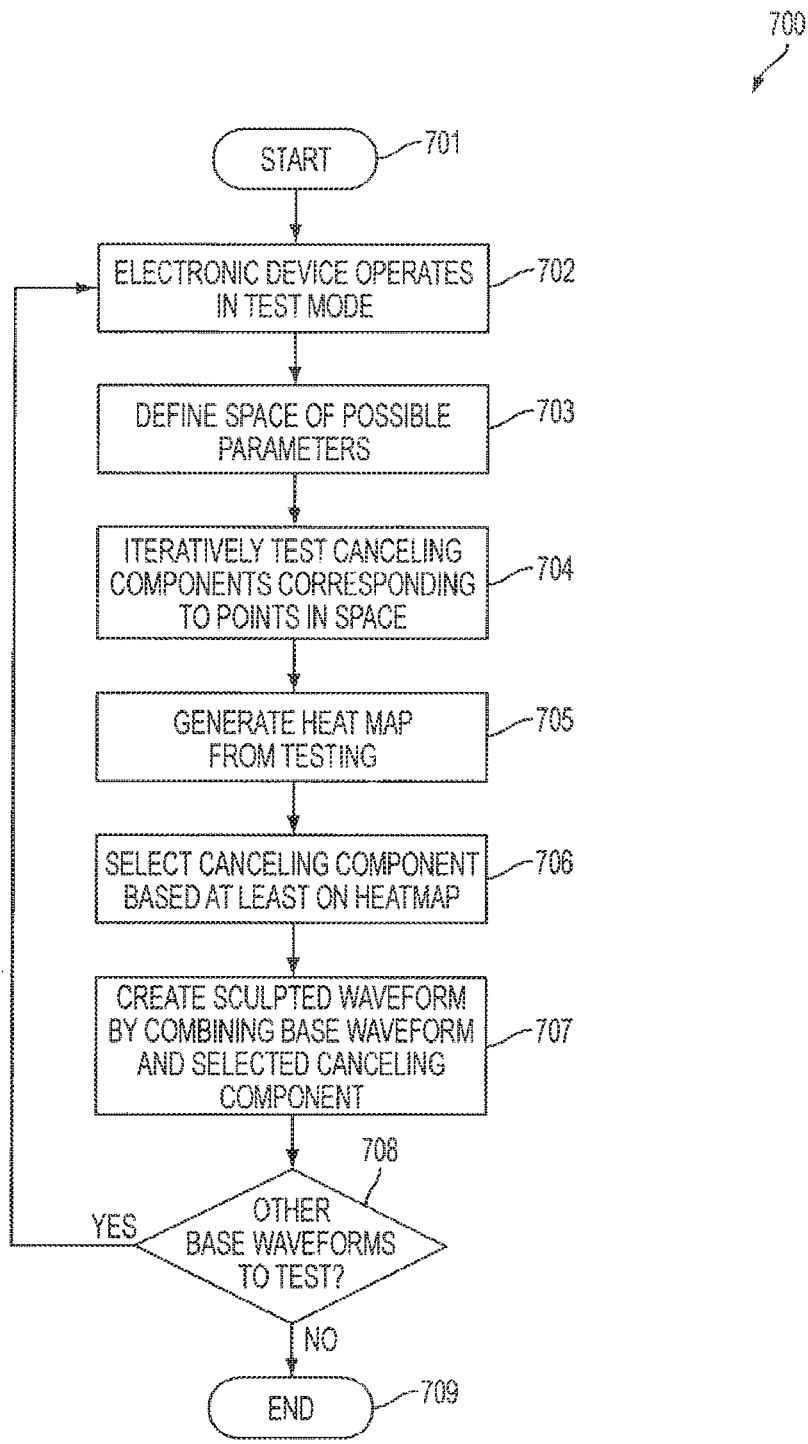
FIG. 7 is a flow chart illustrating a second example method for creating a sculpted waveform with no or reduced unforced response. This method may be performed by the electronic devices of FIG. 1A, 1B, or 2.

FIG. 7 illustrates a second example method 700 for creating a sculpted waveform with no or reduced unforced response. The method 700 may be performed by the electronic devices of FIG. 1A, 1B, 2, or any suitable electronic device. The flow begins at block 701 and proceeds to block 702 where the electronic device operates in a test mode. The flow then proceeds to block 703 where the electronic device defines a space of possible parameters (such as possible times and amplitudes/amplitude ratios) for a canceling component that eliminates or reduces the unforced response of a base waveform.

Figure 8:
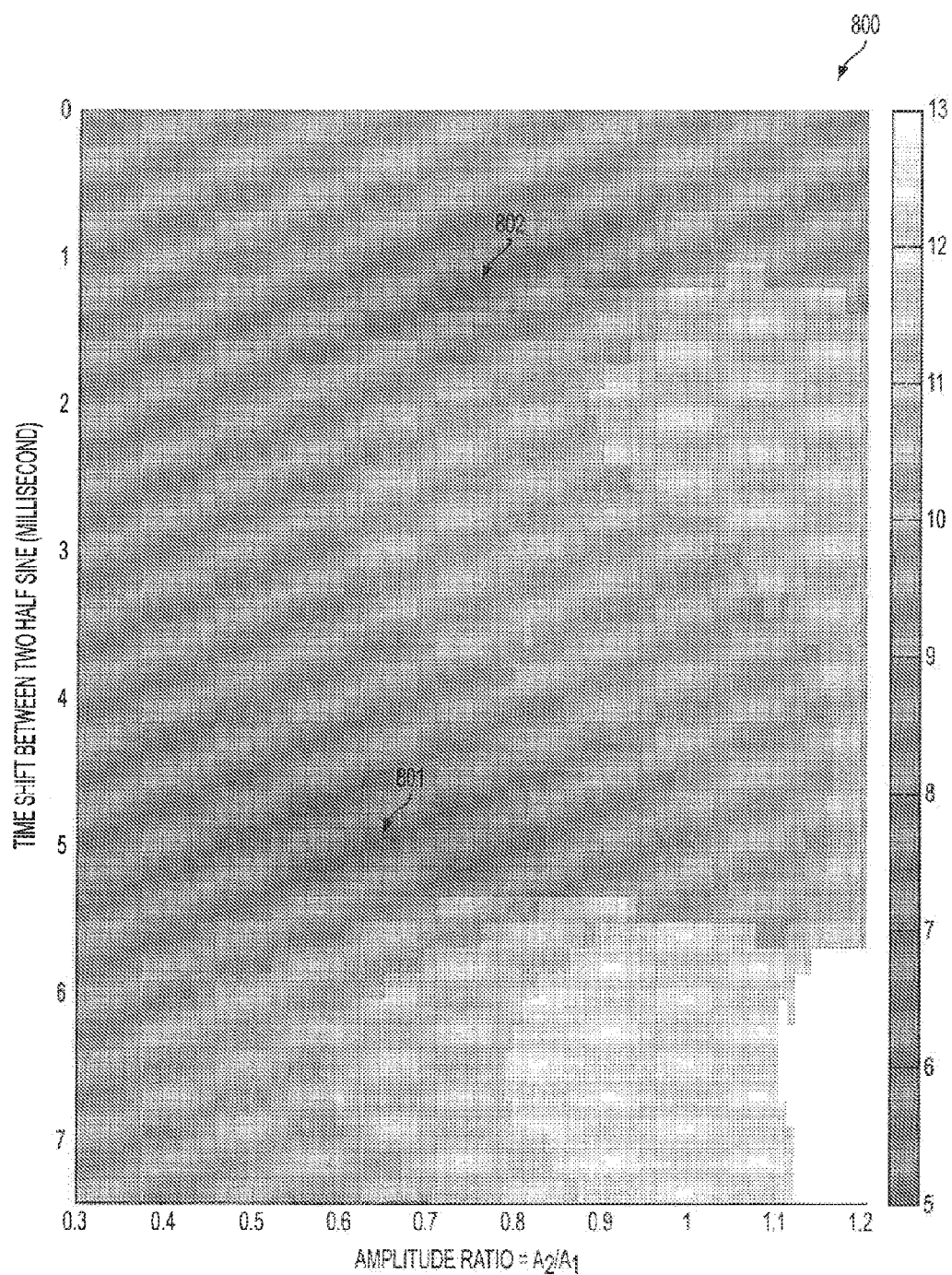
FIG. 8 is a diagram illustrating an example greyscale heat map that may be utilized in performing the method of FIG. 7.

In some cases, such a space may be a two dimensional space of times and amplitudes/amplitude ratios. Such a two-dimensional space of times and amplitudes is illustrated in the chart of FIG. 8. Returning to FIG. 7, in other cases the space may include more than two dimensions and may thus include other possible parameters for canceling components.

In some cases, the times may correspond to the time between the base waveform and the canceling component. In other cases, the times may correspond to the time between a peak of the base waveform and a peak of the canceling component. In still other cases, the times may correspond to the duration of the canceling component. In some cases, the amplitudes may correspond to the amplitudes of the canceling component. In other cases, the amplitudes may correspond to the ratio between the amplitude of the base waveform and the amplitude of the canceling component. In various cases, the point may be arbitrarily chosen or may be chosen based on other such factors such as previous analysis of canceling components corresponding to points in the space as unforced response eliminating or reducing canceling components, a resonant frequency of the electronic device, minimum values for the parameters of the canceling component, user input, and so on.

The flow then proceeds to block 704 where the electronic device iteratively tests canceling components corresponding to points in the space. Such testing may involve testing the unforced response elimination or reduction of a canceling component corresponding to a point by applying the base waveform to the component haptic output device, applying the canceling component corresponding to the point, and monitoring the component haptic output device to determine the unforced response utilizing at least one sensor.

Next, the flow proceeds to block 705 where the electronic device generates a heat map (such as the greyscale heat map of FIG. 8) based at least on the testing. Such a heat map may graphically or otherwise represent the unforced response elimination or reduction of canceling components corresponding to points in the space, such as in greyscale (where darker shades of grey represent less unforced response and lighter shades of grey represent less unforced response or where lighter shades of grey represent less unforced response and darker shades of grey represent less unforced response), color (where darker shades of a color represent less unforced response and lighter shades of the color represent less unforced response, where lighter shades of a color represent less unforced response and darker shades of the color represent less unforced response, where one end of a color sequence represents less unforced response and the other end of the color sequence represents more unforced response, or any other such color representation arrangement), and/or any other such representation.

The flow then proceeds to block 706 where the electronic device selects a canceling component based on the heat map. In some cases, the heat map may indicate that a canceling component corresponding to a point in the space has the most unforced response elimination or reduction and may therefore be selected. However, in other cases, the heat map may indicate that multiple canceling components, each corresponding to different points in the space, have equivalent unforced response elimination or reduction. In such cases, relationships between the canceling components and various related factors may be utilized to select among the canceling components (see FIG. 10).

The flow then proceeds to block 707 where the electronic device generates a sculpted waveform by combining the base waveform with the selected canceling component and stores the sculpted waveform. Subsequently, the sculpted waveform may be utilized instead of the base waveform.

The flow then proceeds to block 708 where the electronic device determines whether or not to test other base waveforms. If so, the flow returns to block 702 and continues to operate. Otherwise, the flow proceeds to block 709 and ends.

Although the method 700 is illustrated and described above as including particular operations performed in a particular order, it is understood that this is for the purposes of example. In other implementations, other configurations of the same, similar, and/or different operations may be performed without departing from the scope of the present disclosure.

For example, though blocks 704 and 705 are shown as performed sequentially, in various implementations the operations may be performed in tandem.

FIG. 8 is a diagram illustrating an example greyscale heat map 800 that may be utilized in performing the method of FIG. 7. As illustrated, the defined space includes time shifts between the base waveforms and canceling components corresponding to points in the space as well as amplitude ratios of canceling components corresponding to points in the space. Further, unforced response elimination or reduction of canceling components corresponding to points in the space is illustrated by greyscale values where darker greys represent less unforced response and lighter greys represent more unforced response.

In this example greyscale heat map 800, points 801 and 802 have the darkest greyscale values in the greyscale heat map. As such, canceling components corresponding to these two points in the defined space may have the least unforced response of canceling components corresponding to any point in the defined space. In this example, the canceling component corresponding to point 801 may be more energy efficient than the canceling component corresponding to point 802. As such, the canceling component corresponding to point 801 may be selected. Subsequently, a sculpted waveform may be generated by combining the canceling component corresponding to point 801 with the base waveform. The sculpted waveform may be stored and may be applied instead of the base waveform.

Although FIG. 8 illustrates a particular example of a heat map, it is understood that this is an example and is not intended to be limiting. In various implementations other heat maps, which may or may not represent unforced response elimination or reduction graphically, may be utilized in preforming the method of FIG. 7 without departing from the scope of the present disclosure.

Figure 9:
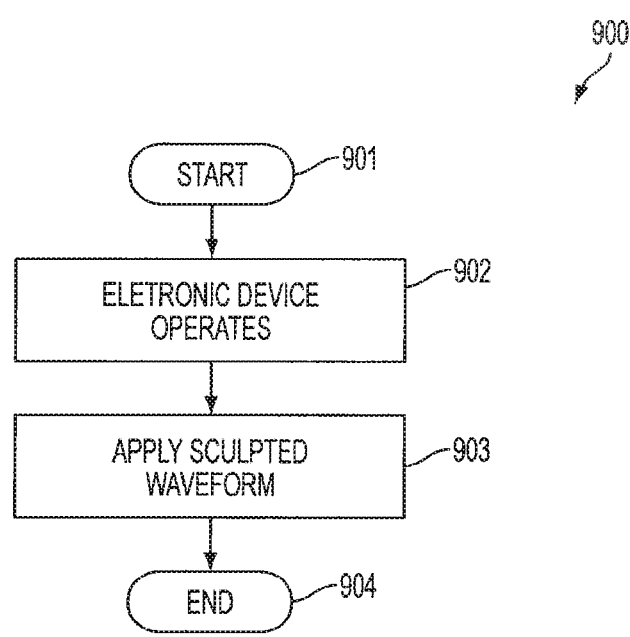
FIG. 9 is a flow chart illustrating an example method for utilizing a sculpted waveform with no or reduced unforced response. This method may be performed by the electronic devices of FIG. 1A, 1B, or 2.

FIG. 9 illustrates an example method 900 for utilizing a sculpted waveform. The method 900 may be performed by the electronic devices of FIG. 1A, 1B, 2, or any suitable electronic device. The flow begins at block 901 and proceeds to block 902 where the electronic device operates. The flow then proceeds to block 903 where the electronic device applies a sculpted waveform that has no or reduced unforced response to a component haptic output device.

The sculpted waveform that has no or reduced unforced response may have been generated and stored by a process such as the method 500 of FIG. 5, the method 700 of FIG. 7, and/or any other technique discussed herein. Additionally, the electronic device may determine to apply a base waveform for which it has no sculpted waveform version of the base waveform that has no or reduced unforced response is stored. In such a case, the electronic device may have a mathematical model of the "ringout physics" of the electronic device (i.e., the forced and unforced responses of the component haptic output device to various waveforms and/or other such resonant frequencies and/or physical properties of the electronic device). The electronic device may then create a sculpted waveform by modeling the determined base waveform, simulating the unforced response, modifying the determined base waveform, and simulating the change from the modification to the unforced response until modifications of the determined base waveform are found that the model predicts may minimize the unforced response. The modified waveform may then be utilized as the sculpted waveform.

The flow then proceeds to block 904 and ends.

Although the method 900 is illustrated and described above as including particular operations performed in a particular order, it is understood that this is for the purposes of example. In other implementations, other configurations of the same, similar, and/or different operations may be performed without departing from the scope of the present disclosure. For example, the method 900 is illustrated and described as applying a single sculpted waveform and ending. However, in various other implementations, the electronic device may determine whether or not to apply various sculpted waveforms and apply such sculpted waveforms accordingly.

Figure 10:
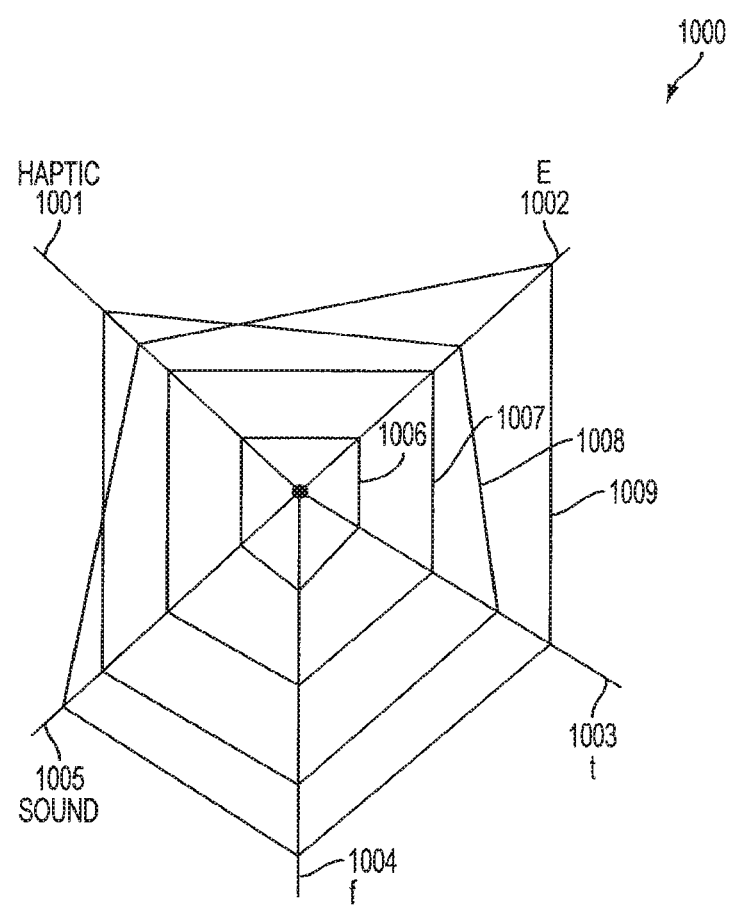
FIG. 10 is an example of a multiple axes chart illustrating relationships between various factors and points in a space of possible parameters for canceling components

FIG. 10 is an example of a multiple axes chart illustrating relationships between various factors and points in a space of possible parameters for canceling components that may be utilized to compare points and/or unforced response elimination or reduction of canceling components corresponding to points in various implementations.

As illustrated, the chart includes an axis 1001 for haptic response performance, an axis 1002 for energy consumption performance, an axis 1003 for time, an axis 1004 for frequency, and an axis 1005 for sound performance. Performance of points in a space of possible parameters for canceling components related to each of the factors corresponding to the axes may be plotted on the chart of FIG. 10. Lines 1006-1009 each illustrate examples of plotting for a respective example point. Based on the plotting of points on such a multiple axes chart, factors (such as haptic response performance, energy consumption, time, frequency, sound performance, and/or other factors that may be relevant in comparing points) other than just unforced response elimination or reduction may be taking into account when comparing points.

Additionally, though the method 500 is illustrated and described above as determining a single point in a space of possible parameters for a canceling component that has superior unforced response elimination or reduction over all other possible points in the space, in some implementations multiple such points may be determined. In such cases, a multiple axes chart or other such comparison tool may be utilized to select among points corresponding to canceling components that have identical unforced response elimination or reduction based upon factors other than or in addition to unforced response elimination or 30 reduction.

As described above and illustrated in the accompanying figures, the present disclosure discloses systems and methods for creation and/or utilization of sculpted waveforms with no or reduced unforced response. An electronic device may generate a canceling component that reduces or eliminates the unforced response for a base waveform applied to a component haptic output device of the electronic device. The electronic device may create a sculpted waveform that has no or reduced unforced response and may store the created sculpted waveform. The electronic device may apply the sculpted waveform to the component haptic output device.

As part of generating the canceling component that reduces or eliminates the unforced response for a base waveform, a starting point in a space of possible parameters (such as possible times and possible amplitudes/amplitude ratios) for the canceling component may be determined. Additional points in the space may be iteratively selected based on testing of canceling components corresponding to previous selected points until no additional unforced response reduction improvement is detected. The testing of the canceling components may involve applying the base waveform to the component haptic output device, applying one or more of the canceling components to the component haptic output device, and monitoring any unforced response utilizing at least one sensor. The canceling component corresponding to point in the space previous to where no additional improvement is found may be selected as the canceling component.

In one embodiment, a space of at least possible parameters (such as possible times and possible amplitudes/amplitude ratios) for the canceling component may be defined. Canceling component corresponding to points in the space may be iteratively tested. A heat map may be generated based on the unforced response cancellation or elimination of the canceling components corresponding to the points. Based at least on the heat map, a canceling component may be selected. A sculpted waveform may then be generated by combining the base waveform with the canceling component. The sculpted waveform may be stored and applied to the component haptic output device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:
1. A method for creating a sculpted waveform with no or reduced unforced response, comprising:
   generating a canceling component, utilizing at least one processing unit, that reduces an unforced response of a base waveform that causes at least one forced response and the unforced response when applied to a haptic output device by:
   defining a space of possible parameters for the canceling component that reduces or eliminates the unforced response;
   iteratively testing points in the space utilizing at least one sensor; and
   selecting a canceling component as the canceling component that reduces or eliminates the unforced response based on the iterative testing; and
   creating the sculpted waveform, utilizing the at least one processing unit, by combining the selected canceling component and the base waveform; wherein
   said operation of iteratively testing comprises:
   selecting one of a first plurality of points on an edge of a first region defined around a beginning point in the space, the one of a first plurality of points corresponding to a first canceling component that has unforced response reduction or elimination over a beginning canceling component corresponding to the beginning point;
   testing unforced response reduction or elimination of first vector canceling components based on first vector points along a first vector defined by the beginning point and the selected one of the first plurality of points until unforced response reduction or elimination of a first of the first vector canceling components corresponding to one of the first vector points is indistinguishable from a second of the first vector canceling components corresponding to a previous first vector point;
   when a second canceling component corresponding to one of a second plurality of points on an edge of a second region defined around the previous first vector point has improved unforced response reduction or elimination over the second of the first vector canceling components, testing unforced response reduction or elimination of second vector canceling components based on second vector points along a second vector defined by the previous first vector point and the one of the second plurality of points on the edge of the second region; and
   when canceling components corresponding to any of the second plurality of points on the edge of the second region does not have improved unforced response reduction or elimination over the second of the first vector canceling components, selecting the second of the first vector canceling components.

2. The method of claim 1, wherein said testing unforced response reduction or elimination of the second vector canceling components based on the second vector paints along the second vector is performed until unforced response reduction or elimination of a first of the second vector canceling components corresponding to one of the second vector points is indistinguishable from a second of the second vector canceling components corresponding to a previous second vector point, further comprising:
   when a third canceling component corresponding to one of a third plurality of points on an edge of a third region defined around the previous second vector point has improved unforced response reduction or elimination over the second of the second vector canceling components, testing unforced response reduction or elimination of third vector canceling components based on third vector points along a third vector defined by the previous second vector point and the one of the third plurality of points on the edge of the third region; and when canceling components corresponding to any of the third plurality of points on the edge of the third region does not have improved unforced response reduction or elimination over the second of the second vector canceling components, selecting the second of the second vector canceling components.

3. The method of claim 1, wherein a size of at least one of the first region is proportional to an error of the at least one sensor.

4. The method of claim 3, wherein a size of at least one of the second region matches that of the first region.

5. The method of claim 1, wherein the possible parameters for the canceling component comprises at least one of times between an amplitude of the base waveform and an amplitude of the canceling component that reduces or eliminates the unforced response or a duration of the canceling component that reduces or eliminates the unforced response.

6. The method of claim 1, wherein the base waveform has a same waveform shape as the canceling component that reduces or eliminates the unforced response.

7. The method of claim 1, wherein the haptic output device comprises a haptic track pad.

8. The method of claim 7, wherein the haptic output device is a component of a track pad.

9. The method of claim 8, wherein the at least one output comprises at least one lateral movement of the track pad.

10. The method of claim 1, wherein the at least one sensor comprises at least one of an accelerometer or a gyroscope.

11. The method of claim 1, wherein the base waveform and the canceling component that reduces or eliminates the unforced response overlap in time.

12. The method of claim 1, wherein the base waveform and the canceling component that reduces or eliminates the unforced response are separated in time.

13. The method of claim 1, wherein the base waveform has a different waveform shape from the canceling component that reduces or eliminates the unforced response.

14. The method of claim 1, wherein the base waveform has a greater amplitude than the canceling component that reduces or eliminates the unforced response.

15. A method for creating a sculpted waveform with no or reduced unforced response, comprising:

generating a canceling component, utilizing a processing unit, that reduces an unforced response of a base waveform that causes a forced response and the unforced response when applied to a haptic output device by:

defining a space of possible parameters for the canceling component that reduces or eliminates the unforced response;

iteratively testing points in the space utilizing a sensor; and selecting a canceling component as the canceling component that reduces or eliminates the unforced response based on the iterative testing by generating a heat map based on the iterative testing and utilizing the heat map to select the canceling component; and creating the sculpted waveform, utilizing the processing unit, by combining the selected canceling component and the base waveform.

16. The method of claim 15, wherein heat map comprises a greyscale heat map wherein greyscale values correspond to unforced response reduction or elimination of canceling components corresponding to points represented in the greyscale heat map.

17. The method of claim 16, wherein darker of the greyscale values represent less unforced response and lighter of the greyscale values represent more unforced response.

18. A method for creating a sculpted waveform with no or reduced unforced response, comprising:

generating a canceling component, utilizing a processing unit, that reduces an unforced response of a base waveform that causes a forced response and the unforced response when applied to a haptic output device by:

defining a space of possible parameters for the canceling component that reduces or eliminates the unforced response;

iteratively testing points in the space utilizing a sensor; and selecting a canceling component as the canceling component that reduces or eliminates the unforced response based on the iterative testing by determining that multiple canceling components corresponding to multiple points in the space have equal improved unforced response reduction or elimination over other canceling components corresponding to other points in the space and selecting among the multiple canceling components by comparing relationships between a plurality of factors for which the multiple points each have a factor rating; and creating the sculpted waveform, utilizing the processing unit, by combining the selected canceling component and the base waveform.

19. The method of claim 18, wherein the plurality of factors include haptic response performance, energy consumption performance, time, frequency, or sound performance.

20. The method of claim 18, wherein comparing the relationships between the plurality of factors uses a multiple axes chart.

* * * * *